United States Patent [19]

Li et al.

[11] Patent Number: 5,546,526

[45] Date of Patent: Aug. 13, 1996

[54] RECONFIGURATION OF DATABASE BY INTERACTIVE MANIPULATION OF ICONS

[75] Inventors: Shih-Gong Li; Theodore J. L. Shrader, both of Austin, Tex.

[73] Assignee: International Business Machines Corporation, Armonk, N.Y.

[21] Appl. No.: 164,864

[22] Filed: Dec. 10, 1993

[51] Int. Cl.⁶ ............................................. G06F 3/14
[52] U.S. Cl. ................................... 395/159; 395/161
[58] Field of Search .................................. 395/161, 159, 395/600, 700, 50, 51, 52, 53, 54, 60; 364/401, 709.12, 498, 148

[56] References Cited

U.S. PATENT DOCUMENTS

| | | | |
|---|---|---|---|
| 4,506,326 | 3/1985 | Shaw et al. | 395/700 |
| 4,813,013 | 3/1989 | Dunn | 364/900 |
| 5,006,992 | 4/1991 | Skeirik | 364/148 |
| 5,189,633 | 2/1993 | Bonadio | 364/709.12 |
| 5,379,366 | 1/1995 | Noyes | 395/54 |
| 5,402,524 | 3/1995 | Bauman et al. | 395/50 |
| 5,428,776 | 6/1995 | Rothfield | 395/600 |

FOREIGN PATENT DOCUMENTS

0546801A2  9/1991  European Pat. Off. .

OTHER PUBLICATIONS

*Proceedings of the 1991 SIGSMALL/PC Symposium on Small Systems*, ACM Press, "A Graphical Notation Editing System (AGNES) Support for Database Modeling Using the Extended E–R Model" to Hsiao Ying Liu, pp. 40–46.
*Systems and Computers in Japan*, vol. 19, No. 11, 1988, "A Visual Interface for an Object–Oriented Query in Relational Databases", Akio Kato et al, pp. 62–69.
*Research Disclosure*, "Icons in the Headings of Columnar Lists", No. 311, Mar. 1990.
*Research Disclosure*, "Iconic Fields", No. 307, Nov. 1989.

*Primary Examiner*—Mark R. Powell
*Assistant Examiner*—Ruay Lian Ho
*Attorney, Agent, or Firm*—J. B. Kraft; Douglas H. Lefeve

[57] ABSTRACT

A method, system and program is provided for reconfiguring a database by the manipulation of table and column icons on a user interactive graphical display interface to the database. In the interactive display, columns are represented by icons and tables are represented by icons which in turn represent combinations of columns. One or more of the table icons are decomposed into the column icons making up the tables. The column icons are displayed in pool areas on the display from which the user may interactively select column icons and combine such column icons to form a new table represented by a table icon.

29 Claims, 6 Drawing Sheets

FIG. 1

| NAME | ID | SITE | ANNUAL SALARY | YEARS EMP. | HRS/WK |
|---|---|---|---|---|---|
| H. JONES | 3339 | BUFFALO | $85K | 16 | 48 |
| D.SMITH | - | - | - | - | - |
| . | | | | | |
| . | | | | | |
| R. FOX | 2416 | AUSTIN | $72K | 22 | 43 |

FIG. 2     TABLE 1

| NAME | TERR. | SALES | HRS/WK | ABSENCE | EXPENSES |
|---|---|---|---|---|---|
| H. JONES | N.Y. | $3.5M | 48 | 20D/YR. | $100K |
| D.SMITH | - | - | - | - | - |
| - | - | - | - | - | - |
| - | - | - | - | - | - |
| R. FOX | TX. | $4.3M | 43 | 10D/YR. | $120K |

FIG. 3     TABLE 2

| NAME | TERR. | SITE | ANNUAL SALARY | EXPENSES | SALES |
|---|---|---|---|---|---|
| H. JONES | N.Y. | BUFFALO | $85K | $100K | $3.5M |
| D.SMITH | - | - | - | - | - |
| - | - | - | - | - | - |
| - | - | - | - | - | - |
| R. FOX | TX. | AUSTIN | $72K | 120K | $4.3M |

FIG. 4     TABLE X

RECONFIGURATION OF DATABASE BY INTERACTIVE MANIPULATION OF ICONS

FIELD OF THE INVENTION

This invention relates to databases accessible through user-interactive displays and particularly to databases which may be configured through the user manipulation of display icons.

BACKGROUND OF THE INVENTION

Databases have become the subject of significant recent interest, not only because of the increasing volume of data being stored and retrieved by computerized databases, but also by virtue of the data relationships which can be established during the storage and retrieval processes. Most of the interest in databases has concerned user demands for an improved ergonomic interface.

One aspect of improved ergonomics is the ability to convey information from a database in a meaningful way to a user. An early attempt at this type of processing is disclosed in U.S. Pat. No. 4,506,326 to Shaw et al, entitled, Apparatus and Method for Synthesizing a Query for Accessing a Relational Database. The patent disclosed a method and apparatus for preparing a linear query to access a relational database and obtain information for display to a user in a linear, sequential report of alphanumeric information.

Structured Query Language (SQL), and in particular ANSI SQL, has become a preferred language media for communicating queries to relational databases. As a consequence, there presently exist thousands of relational databases and thousands of related queries directed to such databases. In view of the great investment of resources in such databases and queries, any new ergonomic interface to database should use and access such databases and queries.

With the growing prevalence of relational databases, communication networks and workstations, the training and experience of a representative system user has decreased in relation to the resources available. The dilemma created by these various events is threefold. First, there exists an established and valuable base of queries formulated with classical SQL expressions. Second, there is a growing usage of relational databases and networks accessing their information. The end users of such databases are routinely less proficient in the very tools needed to efficiently and accurately access the relational database information. Finally, users of database access methods do not receive direct feedback of changes based on their manipulation of the database. Thus, a distinct need exists for methods, systems and programs which convert query statements into visual representations understandable by novice database users, and, in the complement, which convert graphically or visually represented queries into SQL format statements usable in existing databases and network environments.

Thus, in recent years, a great deal of innovation in database management has been driven by user demands for improved ergonomic interfaces to the database through interactive displays.

A recent innovation to improve the ergonomic interface to a knowledge-base system is disclosed in U.S. Pat. No. 4,813,013 to Dunn. The patent reveals an interactive, rule-based system which allows icons to be selectively tied to particular rule definitions. The stored rules are cross-referenced to the icon to which they pertain, so that whenever the icon is selected by a problem solving user for use in building a problem solution, the rules pertaining thereto are accessed and applied.

*IBM Technical Disclosure Bulletin*, "Icons in the Headings of Columnar Lists", March 1990 discloses another example of an ergonomic advance in user interfaces for databases. This TDB discusses a facility to allow icons to appear in the heading area of a columnar list. For example, fields such as security level can have a header that is an icon and looks like a lock. Another IBM *Technical Disclosure Bulletin*, "Iconic Fields", November 1989, discloses icons that can be selectively opened to reveal detailed information concerning the field and its contents. Then, when the user has adjusted the detailed information, the field can be deselected and returned to an icon.

Copending U.S. patent application Ser. No. 07/803,876, filed Dec. 9, 1991, and assigned to the assignee of the present application covers a system wherein the status of a database table is determined and graphically displayed as a table organized iconic representation of selected information for table columns and keys. A user can also select an icon to open a dialog box of detailed information relating to the particular column or key. The dialog box enables the user to directly view or manipulate particular aspects of the database. The table organized, iconic representation provides concise, visual information indicating the relationships between columns and keys and visually coaches a user to select the appropriate information to satisfy the user's requirements.

Copending U.S. patent application Ser. No. 07/803,875 filed Dec. 9, 1991 entitled "Iconic Representation for Table Columns", and assigned to the assignee of the present application discloses the employment of specialized icons to present to the user information stored in a database and to permit the user to manipulate such information via operations on the icon. Preferably the icons represent columns.

As the prior art indicates, icons have been used in connection with databases to access data in such databases and to manipulate the data. However, the use of icons to construct and reconstruct databases has been fairly limited. As will be described hereinafter, the present invention is directed to the user interactive display system wherein icons are used to construct or reconstruct databases.

SUMMARY OF THE INVENTION

It is the primary object of the present invention to provide a user interactive display system in which databases are reconfigured through the manipulation of icons.

The graphical interface to databases is through graphical tables made up of columns, each column providing access to a given category or type of information, for example, if one were dealing with personnel data, a given column could provide the employee i.d. number, the next column could provide the employee initial employment date, the next column could provide employee's pay category, the next column could provide employee's date of birth and so on. The present invention is directed to the reconfiguration or reconstruction of tables and thus the databases which such graphical tables represent. In the present invention, the database is graphically represented by a table made up of a group of columns on the display. The present system has means for decomposing at least one and preferably a plurality of such tables into the discrete column icons. It has means for displaying the resulting discrete column icons in a pool area and means for permitting the user to select column icons from said pool areas and combining the column icons to form a new table.

More specifically, the present system has means for representing the tables by respective table icons and has further means for decomposing such tables by moving the table icons of the tables to be decomposed into said pool area whereupon said decomposition takes place. In more specific aspects of the present invention, means are included for eliminating all table associations from the column icons and from the stored columns which the icons respectively represent when the column cons are in the pool area.

DETAILED DESCRIPTION OF THE INVENTION

In order to illustrate the practice of the present invention, we will describe our embodiment in the context of a user interactive display system for interfacing with databases as described in the above-mentioned copending U.S. application Ser. No. 07/803,876, filed Dec. 9, 1991, "Iconic Table of Database Information", which covers a system wherein the status of a database table is determined and graphically displayed as a table organized conic representation of selected information for table columns and keys.

Figure 1:
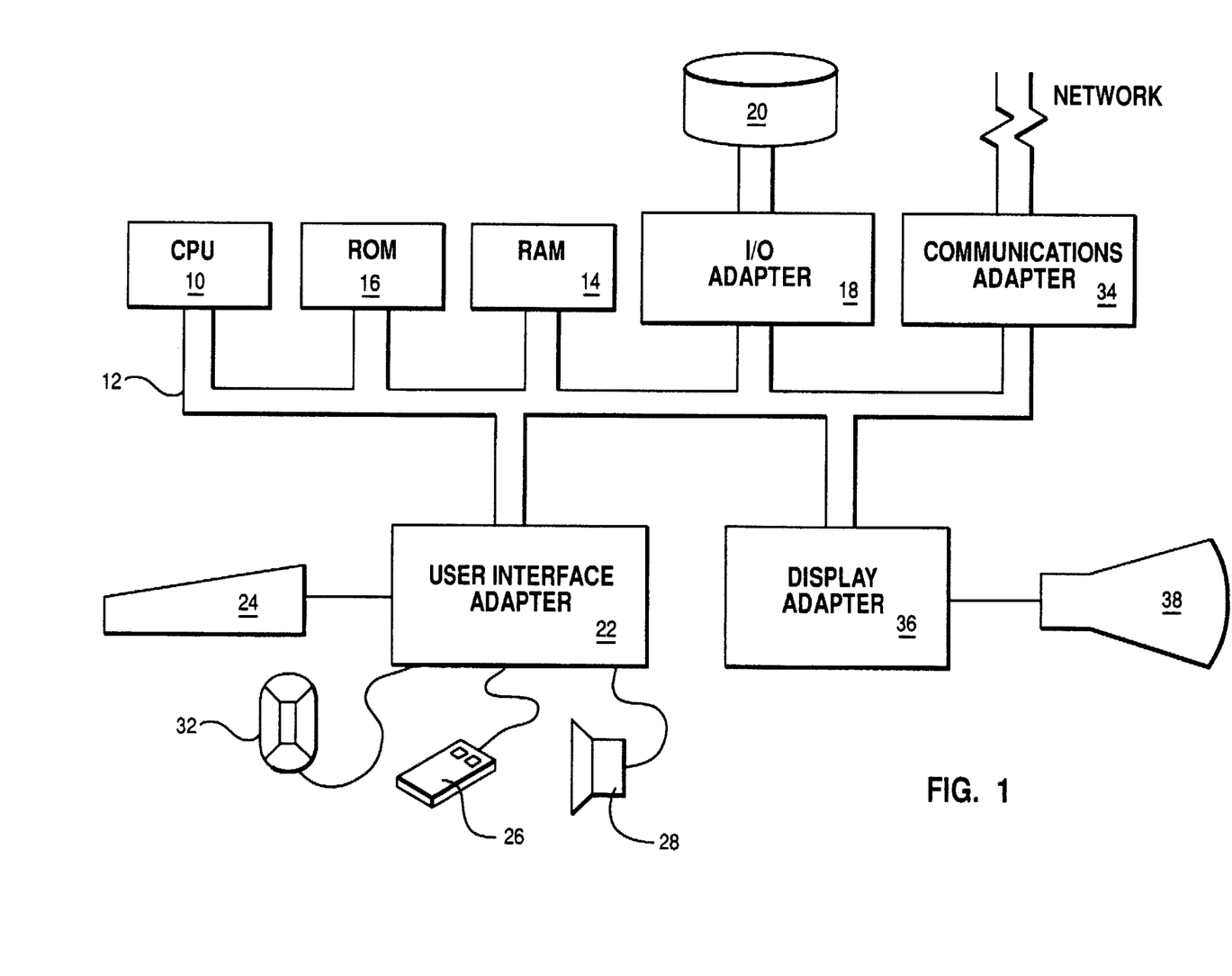
FIG. 1 illustrates a typical configuration of a workstation on which the subject invention is utilized.
Figure 2:
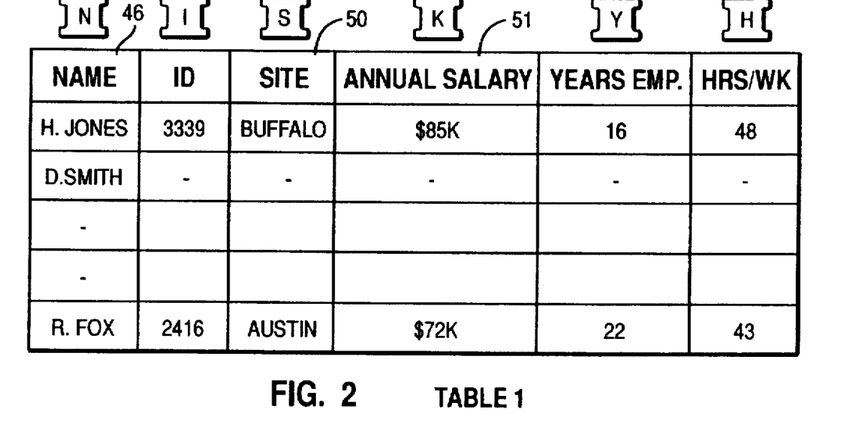
FIGS. 2–4 illustrate the composition of tables utilized in a database, in accordance with this invention.
Figure 3:
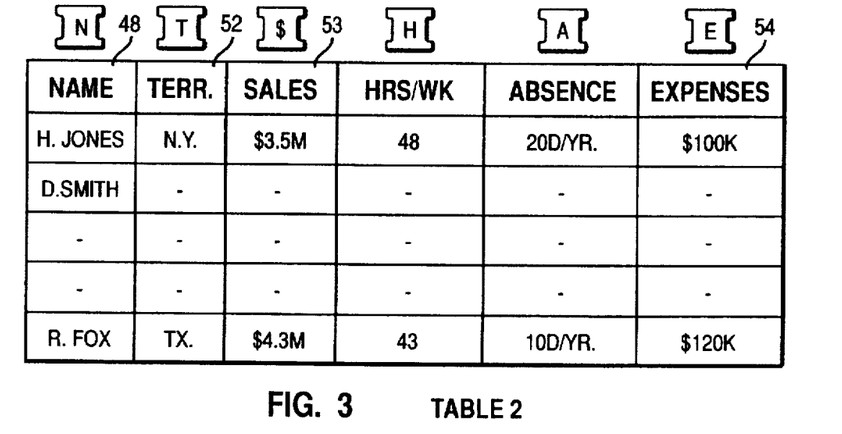

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for Connecting the workstation to a data processing network and a display adapter 36 for connecting the bus to a display device 38.

The workstation has resident thereon the OS/2 base operating system and the aforementioned Database Manager relational database program. The invention further contemplates that preexisting queries formulated in classical SQL format be conveyed-to the workstation and subjected to conversion into visual or graphical, iconic information for display on a graphic display 38. The user thereafter interfaces to the database via the graphic display and dynamically views the results of any changes to the database information on the graphic display. The reader is referred to IBM's *SQL REFERENCE*, S04G-1012 (1991) for a detailed description of statements in the Structured Query Language (SQL). The *SQL REFERENCE* is incorporated by reference in its entirety.

A database is a collection of information stored in a computer. The data is arranged as rows in tables, which represent groups of related information. A database may contain one or more tables. Structured Query Language (SQL) is an established set of statements that can be used to manage information that is stored in a database. By using these statements, a user can add, delete or update information in a table or request information from one or more tables in the form of a report. SQL performs operations on the tables to access the information within them without the user needing to know how the data is physically stored.

Referential integrity refers to the rules that govern some of the relationships within a database. Referential integrity is enabled by adding referential constraints to table and column definitions of a database. A referential constraint defines the rules for a relationship between a parent table and a dependent table. A parent table is the table containing the primary key that defines the relationships with a foreign key in another table. A table can be a parent in any number of relationships.

A primary key is a column or an ordered collection of columns whose values uniquely identify a row. To be unique, this collection of values cannot be duplicated in any other row. A primary key need not have a dependent foreign key.

A foreign key is one or more columns in a table whose values match the values of a primary key of a table. A foreign key is used to establish a relationship with a primary key for the purpose of enforcing referential integrity among tables. A referential constraint is an assertion that non-null values of a foreign key are valid only if they exist as values of the primary key in a parent table.

A dependent table is a table containing the foreign key that defines the relationship. A table can be a dependent in multiple relationships.

User interfaces for database tables typically shield users from a complete table definition at one time. Users are given specific subsets of the database information to view at a given time, such as column definitions or the primary key definition. The user is not given an effective method for drawing relationships between the columns and keys in the table without opening additional windows or panels.

Information about database tables is presented in the form of icons and numbers. This gives the user a global sense of the structure of the various tables and helps enhance the implementation of manipulating columns and tables through the icons representative of such.

The principles and operation of the present invention are best understood by first considering the general procedure involved with respect to FIGS. 2–5. First assume that the Ace Water Company has a database of employee data. An object oriented interface is provided to this database through window 40 in FIG. 5. This interface contains a group of table icons 42 each representative of a table of employee data stored in the employee database. The window also contains a group of view icons 43 each representative of a different view of data stored in said database. For the purposes of this invention, a view may be distinguished from a table in that a view is a portion or combination of data from one or more of said tables. A view is more transitory than a table in that a view is not stored as an entity in the database, but rather is created logically each time it is selected. Thus, if any of the database tables from which the view is logically created is ever discarded, then that particular view can no longer exist or be selected since the view must be created each time it is selected from the tables which support it.

Figure 4:
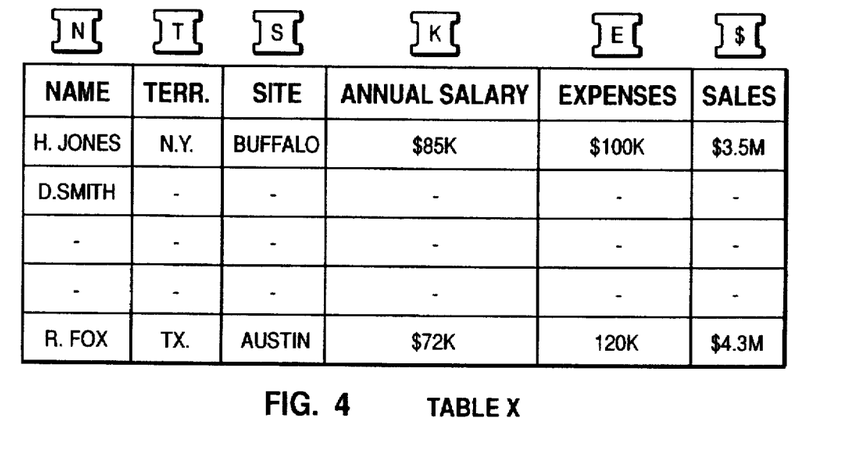
Figure 5:
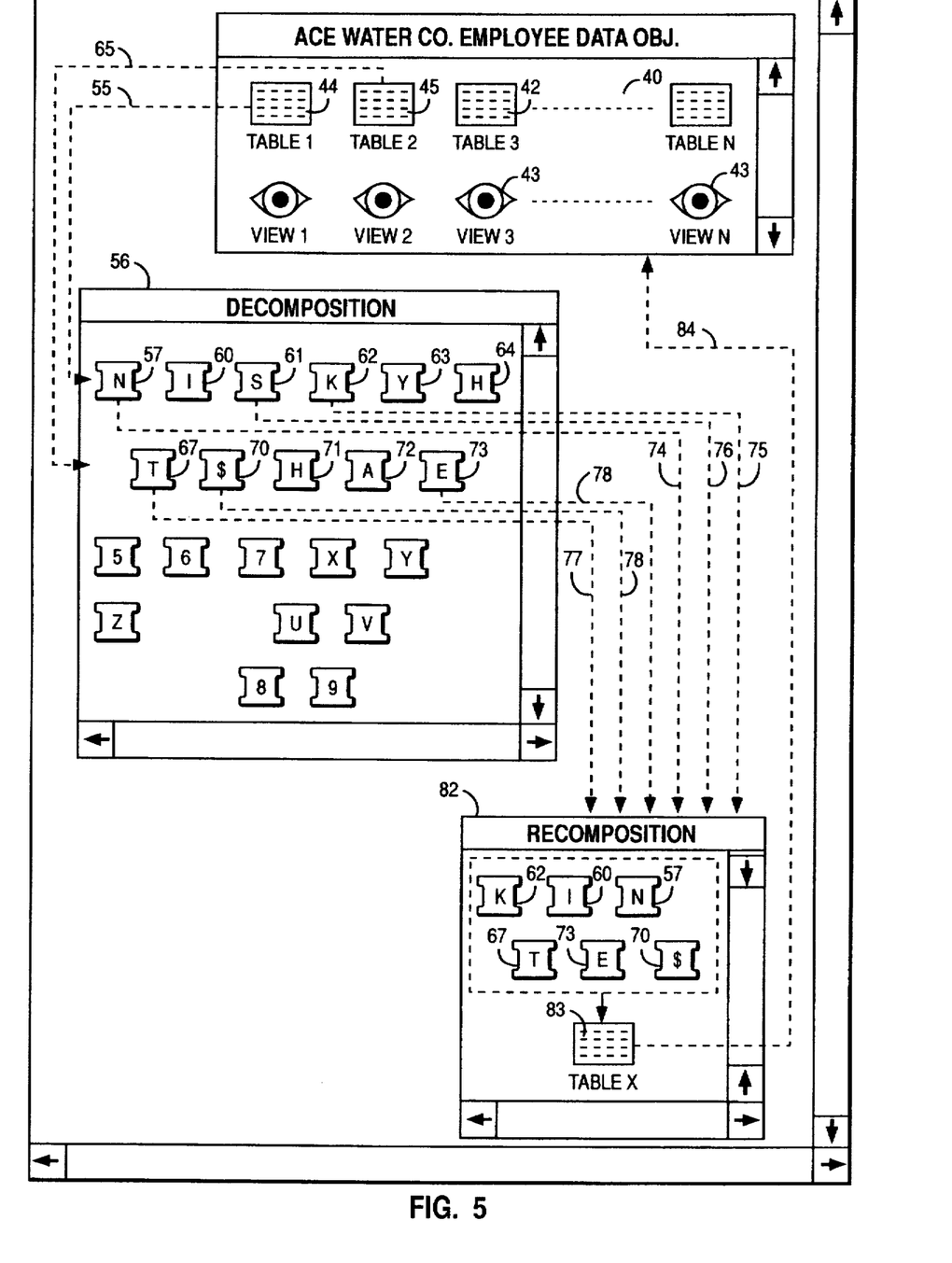
FIG. 5 illustrates the display of a plurality of windows used in the restructuring of database tables, in accordance with this invention.

In order to illustrate the present invention, let us assume that among the tables in the database are Table 1, represented by icon 44, and Table 2 represented by icon 45, in FIG. 5. These tables are respectively shown in FIGS. 2 and 3. The Ace Water Company has a group of salesmen, H. Jones . . . R. Fox, listed in column 46 of Table 1. In Table 1, which is part of the Company's employee database, the personnel information concerning these employees is shown as respective attributes in the columns of the table. The same-sales employees are listed in column 48 of Table 2 which gives sales information and data related to the work patterns of the same group of salesmen. The user of the database desired to create a new table, Table X (FIG. 4), which will combine the attribute covered by selected columns from Table 1 and Table 2. Table X is to combine site column 50 and annual salary column 51 from Table 1 with territory column 52 sales column 53 and expenses column 54 from Table 2 to provide new Table X.

Now, with respect to FIG. 5, the user interface for carrying out this procedure will be described. The user, using a conventional mouse such as mouse 26 in FIG. 1, selects Table 1 icon 44 in window 40 and drags it along path 55, depositing it in decomposition container window 56. When the Table 1 icon 44 is deposited in container window 56, it decomposes into six column icons each representative of one of the icons in Table 1, i.e. name icon 57, ID column icon 60 site column icon 61, salary column icon 62, years icon 63 and hours icon Table 2 icon 45 is dragged along path 65 from database window 40 and also deposited in decomposition container window 56 wherein it also decomposes into icons representative of the columns in Table 2, i.e.: name column icon 66, territory column icon 67, sales column icon 70, hours column icon 71, absence column icon 72 and expenses column icon 73. After this decomposition, the resulting column icons are part of a pool of column icons in decomposition container window 56.

Then in the recomposition of selected ones of said column icons to create Table X using a pointing device such as mouse 26, name column icon 57, salary column icon 62, site column icon 61, territory column icon 67, sales column icon 70 and expense column icon 73 are respectively dragged along paths 74–81 into recomposition container window 82 in which these icons are combined to provide Table X as represented by icon 83 which is subsequently selected and dragged back into database window 40 along path 84. Table X which is shown in FIG. 4 is then part of the Ace Water Company employee database and is represented by icon 83.

Now that we have illustrated the user interface manipulation involved in the practice of the present invention, let us consider the significant programming processes involved in the invention.

Figure 9:
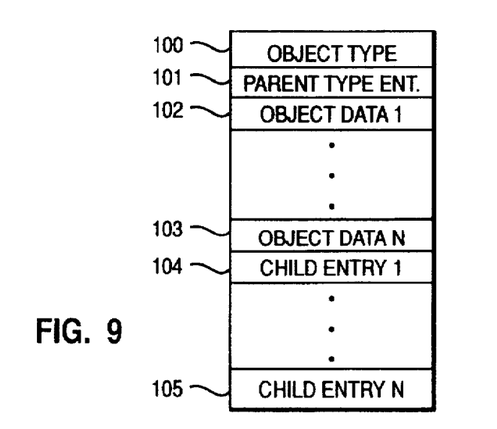
FIG. 9 illustrates the data structure of the objects of the database elements that are restructured in accordance with this invention.

The icon object which will be described within the workstation environment of FIG. 1 has a data structure organized as shown in FIG. 9. Both the table icons and the column icons are supported by such data structures. The type of the object itself is stored at item 100 in FIG. 9. The object's parent type, if any, is stored as item 101. Data unique to the object is stored at levels 102–103. The child object entries (or pointers) for the object, if any, are stored at levels 104–105. In the present example, assuming this is the data structure for the table object, its parent entry would be the database object and its child entries would be the column objects that it contained. Other extensions to the table structure could be entries to define allowable child object types that the table object could accept. The object could also allow a hierarchical set of parent type entries, meaning that the object could have more than one parent and the ordering of the elements in the set would determine which one it would attempt to compose with when it had to relate to a parent.

Thus, when an object with the data structure of FIG. 9, i.e. a table object, is dropped or moved into a decomposition container as in window 56 of FIG. 5, it will split into its child icons as previously described. When this occurs, the table icon which was dropped into the decomposition container 56 disappears and in its place appears the column objects that it possesses as shown in window 56 of FIG. 5.

Conversely, when an object or set of objects with the data structure as shown in FIG. 9 are dropped into the recomposition container window 82, FIG. 5, all the column icons or objects with the same parent type will group together as their single parent icon object. For example, if a number of column objects were dropped on a composition container, they would disappear and in their place would appear their parent table icon object.

Now with reference to the flow charts of FIGS. 6–8, the logic in accordance with the present invention will be described. The general operation of the decomposition container in window 56 of FIG. 5 and the recomposition container in window 82 of FIG. 5 will now be described. The operation begins with the user dropping one or more icons into window 56, step 106, FIG. 6. Hereinabove, the icons for Table 1, 44, and Table 2, 45, were moved along paths 55 and 65 into the decomposition container 56. When it is determined, in step 106, FIG. 6, that one or more icons are present, the operation branches to entry point A in FIG. 7 where we will now follow the decomposition operation. In initial step 110, the operation is initialized by setting a counter which we designate "i" equal to zero. Next, decision step 111, a determination is made as to whether counter "i" is initially set to zero is less than the number of icons dropped into the decomposition container. If it is not, then there must be no remaining dropped icons in the container and step 112, the decomposition container is repainted on the screen to show the new icons in the container which, as will be hereinafter described, will be child icons; in this case the column icon. The operation is then ended with exit step 113.

On the other hand, if in decision step 111, a yes results, then step 114 counter "i" is incremented by adding a one. One of the dropped icon objects, which in the present case will be the Table 1 icon is designated object X. The operation proceeds to decision step 115 where a determination is made as to whether object X, which in this case is the Table 1 icon, has any child icons, which in this case would be the column icon. If the decision step determines that there were no child icons (which is not the present case), then, step 119, object X would not be decomposed. The copy of the table icon that the user attempted to drop would not be added to the decomposition container since it did not have any child icons.

In any event, in the present case, decision step 115 determines that object X (Table 1) has child icon objects (column icons). It does so by reading the data structure shown in FIG. 9. Thus, control passes to functional block or step 117 where another counter "j" is initialized to zero. The operation then continues to decision block 118 where a determination is made as to whether counter "j" has a number less than the number of child objects for object X. Of course, a No will occur only when all of the child objects have been processed, as will be subsequently described. In that case, object X is removed from the decomposition container in window 56, FIG. 5, function block or step 119. On the other hand, as in the present case, if counter "j" is less than the number of column objects, the logic flows to functional block 120 where counter "j" is incremented by adding one and the current child or column of object X (Table X) is designated as column object "y".

Logical control then continues to decision block 121 where a determination is made as to whether "y", the child object, which in this case would be the column, already exists as a member of the decomposition container. It should be noted that in the present example as previously described with respect to Tables 1 and 2 shown in FIGS. 2–3 and FIG. 5, Tables 1 and 2 have one redundant column, i.e. the name column. Consequently, as shown in FIG. 5 when Table 2, 45, was decomposed in decomposition container in window 56, there was no name icon because the name column icon 57 already existed and another name column or icon would be redundant. Thus, in the example, there would be a yes branch from decision block 121 back to decision block 118 and the next child icon would be processed. On the other hand, if in decision block 121 a determination is made that the column icon does not exist, the logic flows to functional block 122 where icon y is added to the decomposition container in window 56 of FIG. 5, after which the logic flows back to decision block 118.

In this manner, the system logic flow continues until in decision block 118 it is determined that "j" is no longer smaller than the number of child objects (columns), i.e. all the column icons have been processed. Table icon (object X) is then removed from the decomposition container block 119 and the flow is returned to decision block 111. When all of the parent or table icons have been processed, a no determination is made by decision block 111 and the logic flows to functional block 112, the decomposition container is repainted and the decomposition procedure ends, step 113.

Figure 6:
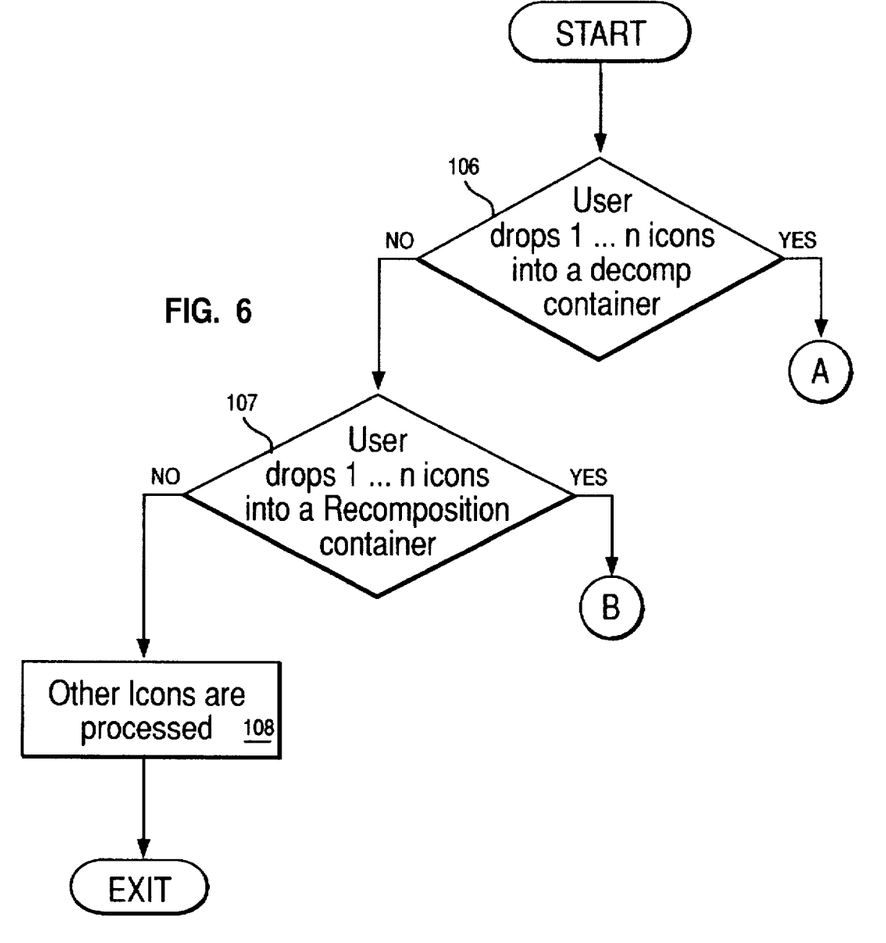
FIGS. 6–8 are flow charts which illustrate the logic of the operation of the structure and steps of this invention.
Figure 7:
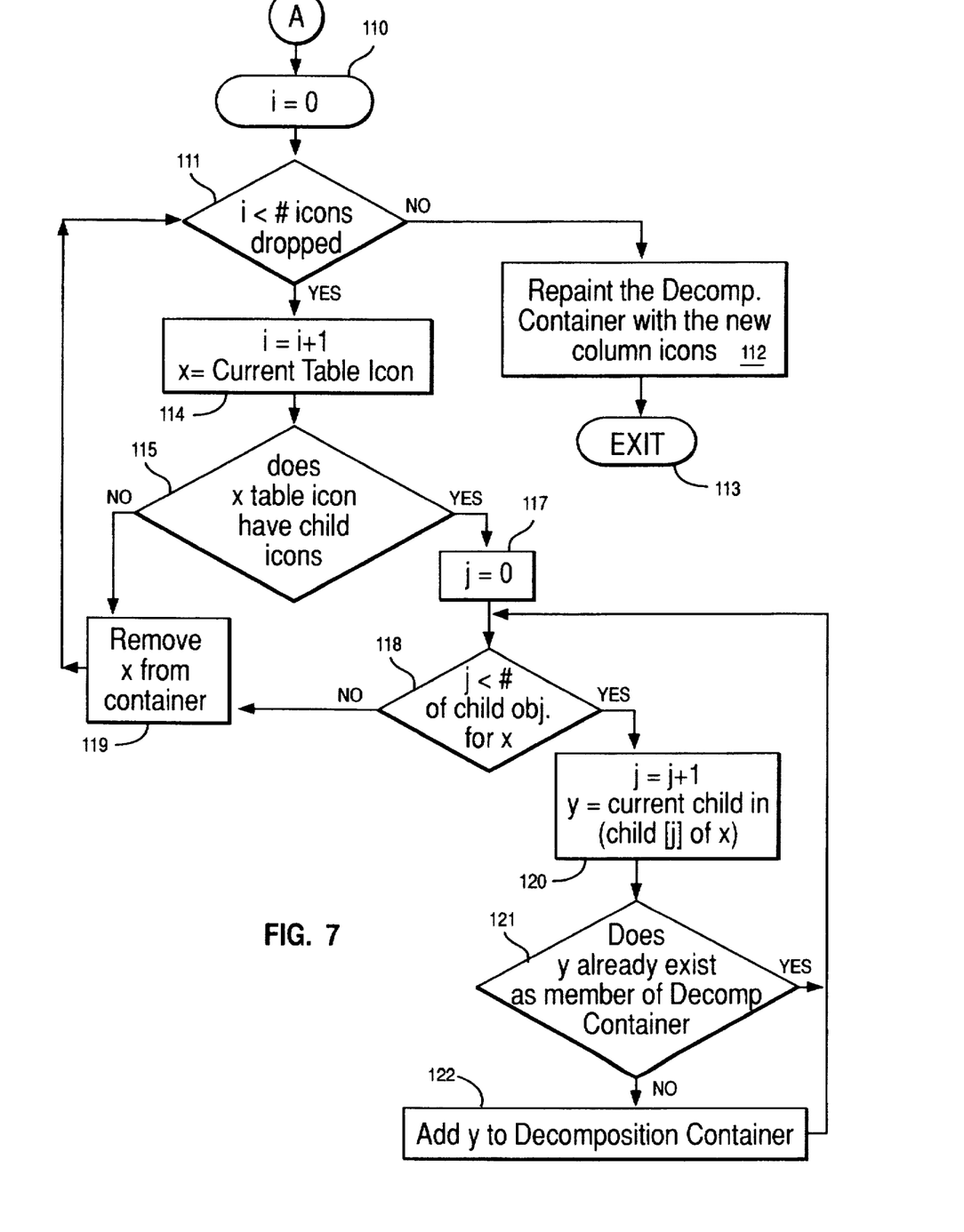
Figure 8:
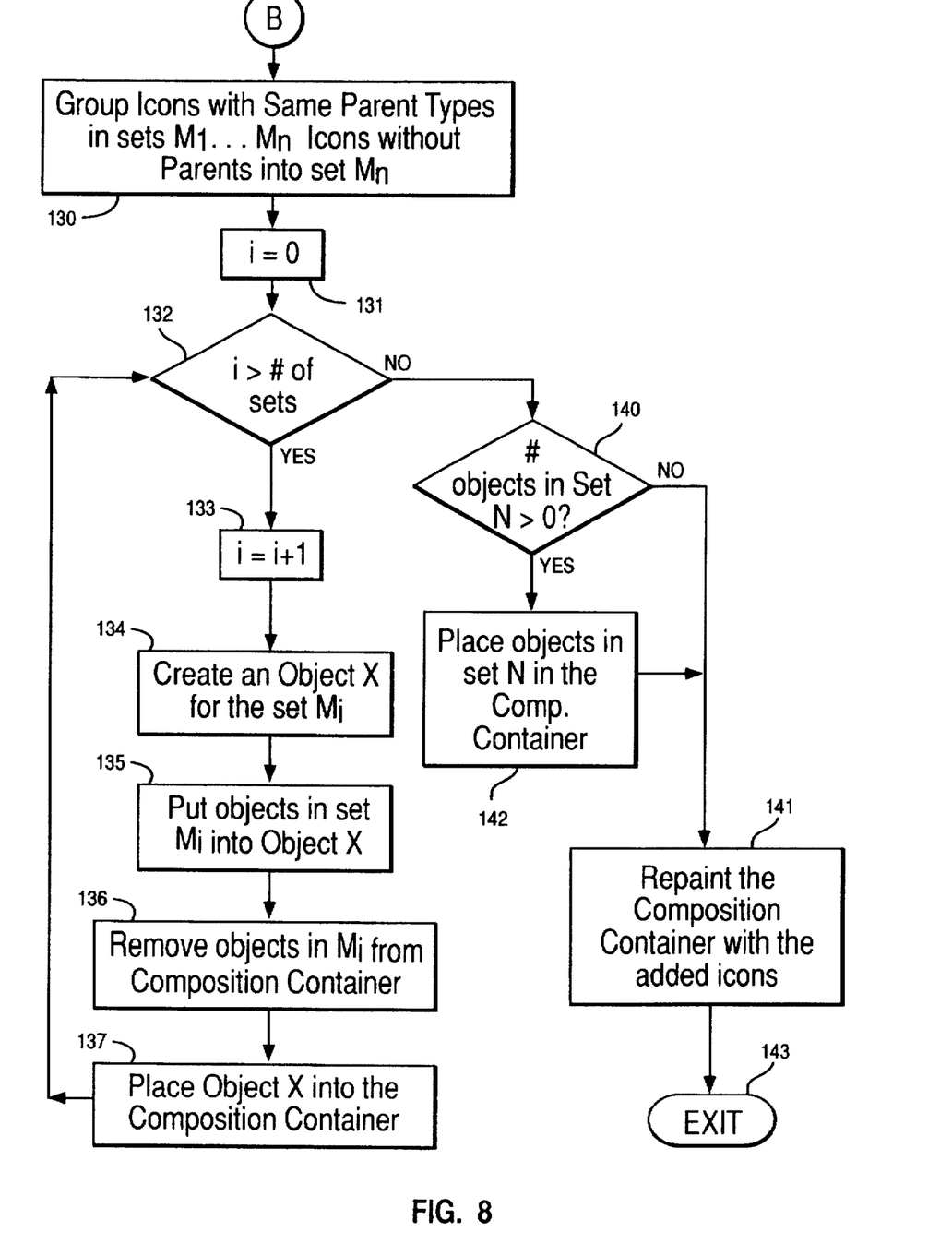

Upon exiting from the decomposition process of FIG. 7, the logic returns to decision block 106 of FIG. 6. Since all of the parent icons dropped into the decomposition container have now been processed, a no branch flows the logic to decision block 107 where a determination is made as to whether the user has dropped or deposited child icons into the recomposition container in window 82 of FIG. 5. Since, in the present case as previously described, column icons 62, 60, 57, 67, 73 and 70 have been deposited in the recomposition container in window 82 to be recomposed into Table X, 83, which is detailed in FIG. 4, the logic branches to entry point B, FIG. 8.

The control logic, block 130, groups all the icons with the same parent types into individual sets designated from $M_1$ through $M_n$. For convenience, icons without parents are grouped into set $M_n$. In the present example described hereinabove, icons 60, 62, 57, 67, 70 and 73 in the recomposition container of window 82 all have the same parent types, i.e. Tables 1 and 2 are of the same types. Consequently, there would only be one set which we can designate as $M_i$. The logic flows to block 131 where counter "i" is initialized to zero. The logic control then continues to decision block 132 where a determination is made as to whether the number of sets M exceed the value of the counter "i" which is now zero. In the present case, there is one set $M_1$ resulting in a yes decision which flows the control to functional block 133 which increments counter "i" by adding one. The system then flows to functional block 134 where an object X is created of the parent type shared by all of the icons in set $M_i$. In the present case as shown in the above example described with respect to FIG. 5, that object is Table X. Control then flows to functional block 135 where all of the column icon objects in set $M_i$ are placed into Table X and the logic flows to functional block 136 wherein all of the objects, i.e., column icons, in set $M_i$, which are to be combined into object X are removed from the recomposition container. With reference to FIG. 5, this means that icons 62, 60, 57, 67, 73 and 70 will be removed from the recomposition container in window 82 and only Table X, 83, will remain as set forth in functional block 137 in FIG. 8.

The logic then flows back to decision block 132. Since there are no more M sets in the recomposition container in window 82 of FIG. 5, the decision will be No and the system will flow to decision block 140, which means that all of the icon sets M have now been processed. In decision block 140, a determination is made as to whether there are any icon objects in set N, i.e. any remaining icon objects without parent types. In present case, there are none and the No branch from decision block 140 would flow to functional block 141. On the other hand, had there been remaining objects in set N, flow would have been to logic block 142 and the remaining icons in said n would have been placed in the composition container and then the flow returned to functional block 141 where the recomposition container and the remaining icons would be repainted after which the recomposition procedure would be exited, step 143, and the logic returned to decision block 107 in the flow chart of FIG. 6.

A No decision from this block would then flow the logic to block 108 wherein other icons which were not dropped on either a decomposition container or a recomposition container would be processed. This would include processing of icon objects dropped in a general purpose container, the operation of which is not pertinent to the present invention. These would be processed by the rules implemented by the object system which are not related to the present invention. Upon the completion of the processing of the object, set forth hereinabove with respect to FIG. 5, Table X, 83, is now a stored entity and icon 83 may be moved into window 40 as previously described along path 84 to provide an object icon interface to the Ace Water Company employee database shown in window 40 of FIG. 5.

In the preferred embodiment of the present invention, the operations described herein are controlled by a code module in the random access memory 14, FIG. 1. The code module could be incorporated into the basic operating system for the interactive display which is stored in RAM 14 or it could be part of an application program stored in RAM 14. Until required by the system, the set of instructions could be stored in another memory associated with the system, e.g. a hard disk stored in disk unit 20 or in a removable memory such as a conventional floppy disk or optical disk.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A system for restructuring, by a user, on a user-interactive display, tables of databases in which data of said databases is stored in a structure of said tables made of columns, comprising:

means for graphically representing said columns as icons on said display, means for graphically representing tables as combinations of said column icons, means for graphically decomposing and displaying said column icons associated with at least one of said tables into discrete column icons in a displayed pool area, and means for permitting the user to select column icons from said displayed pool area and combining said column icons in a displayed recomposition area to form a new table.

2. The system of claim 1 wherein said decomposing means decompose a plurality of said tables.

3. The system of claim 2 wherein each of said plurality of tables is respectively graphically represented on said display by a table icon.

4. The system of claim 3 further including means for selecting and means for moving said table icons.

5. The system of claim 4 wherein said means for decomposing said tables include selecting table icons.

6. The system of claim 5 wherein said means for decomposing said tables include means for displaying the discrete column icons in said tables represented by said selected table icons.

7. The system of claim 6 wherein said means for decomposing said table further include means for moving said selected table icons into said pool areas whereupon said decomposition into said column icons occurs.

8. The system of claim 7 further including means for eliminating all table associations from the column icons in said pool areas and from the stored columns which said icons respectively represent.

9. The system of claim 8 further including means for determining column icons in said pool areas which represent redundant data columns.

10. The system of claim 9 further including means for removing said icons representing redundant columns.

11. A method for restructuring, by a user, on a user-interactive display, tables of databases in which data of said databases is stored in a structure of said tables made of columns, said method comprising:

graphically representing said columns as icons on said display, graphically representing tables as combinations of said column icons, graphically decomposing and displaying said column icons associated with at least one of said tables into discrete column icons in a displayed pool area and permitting the user to select column icons from said displayed pool area and combining said column icons in a displayed recomposition area to form a new table.

12. The method of claim 11 wherein a plurality of said tables are decomposed.

13. The method of claim 12 wherein each of said plurality of tables is respectively graphically represented on said display by a table icon.

14. The method of claim 13 wherein said step of decomposing said tables includes selecting to table icons.

15. The method of claim 14 wherein said steps of decomposing said tables includes displaying the discrete column icons in said tables represented by said selected table icons.

16. The method of claim 15 wherein said decomposing said table further includes the step of moving said selected table icons into said pool areas whereupon said decomposition into said column icons occurs.

17. The method of claim 16 further including the step of eliminating all table associations from the column icons in said pool areas and from the stored columns which said icons respectively represent.

18. The method of claim 17 further including the step of determining column icons in said pool areas which represent redundant data columns.

19. The method of claim 18 further including removing said icons representing redundant columns.

20. A computer program product for restructuring tables of databases by a user, on a user-interactive display, in which data of said databases is stored in a structure of said tables made of columns, comprising:

a computer usable medium having computer readable program code means embodied in said medium for graphically representing said columns as icons on said display, computer readable proqram code means embodied in said medium for graphically representing tables as combinations of said column icons, computer readable program code means embodied in said medium for graphically decomposing and displaying said column icons associated with at least one of said tables into discrete column icons in a displayed pool area, and computer readable program code means embodied in said medium for permitting the user to select column icons from said displayed pool area and combining said column icons in a displayed recomposition area to form a new table.

21. The computer program product of claim 20 wherein said computer readable program code means for decomposing includes computer readable program code means embodied in said medium for decomposing a plurality of said tables.

22. The computer program product of claim 21 further including computer readable program code means embodied in said medium for graphically representing each of said plurality of tables on said display by a table icon.

23. The computer program product of claim 22 further including computer readable program code means embodied in said medium for selecting and computer readable program code means embodied in said medium for moving said table icons.

24. The computer program product of claim 23 wherein said computer readable program code means for decomposing said tables include computer readable program code means embodied in said medium for selecting table icons.

25. The computer program product of claim 24 wherein said computer readable program code means for decomposing said tables include computer readable program code means embodied in said medium for displaying the discrete column icons in said tables represented by said selected table icons.

26. The computer program product of claim 25 wherein said computer readable program code means for decomposing said table further include computer readable program code means embodied in said medium for moving said selected table icons into said pool areas whereupon said decomposition into said column icons occurs.

27. The computer program product of claim 26 further including computer readable program code means embodied in said medium for eliminating all table associations from the column icons in said pool areas and from the stored columns which said icons respectively represent.

28. The computer program product of claim 27 further including computer readable program code means embodied in said medium for determining column icons in said pool areas which represent redundant data columns.

29. The computer program product of claim 28 further including computer readable program code means embodied in said medium for removing said icons representing redundant columns.

* * * * *